United States Patent [19]

Blee et al.

[11] Patent Number: 4,974,926
[45] Date of Patent: Dec. 4, 1990

[54] UNDERWATER OPTICAL FIBER CABLE

[75] Inventors: John J. Blee, Lilburn; Nathan E. Hardwick, III; LaVerne C. Hotchkiss, both of Dunwoody; Dan L. Philen, Atlanta, all of Ga.

[73] Assignee: AT&T Bell Laboratories, Murray Hill, N.J.

[21] Appl. No.: 334,649

[22] Filed: Apr. 6, 1989

[51] Int. Cl.$^5$ .............................................. G02B 6/44
[52] U.S. Cl. .................................................. 350/96.23
[58] Field of Search ..................................... 350/96.23

[56] References Cited

U.S. PATENT DOCUMENTS

| | | | |
|---|---|---|---|
| 4,227,770 | 10/1980 | Gunn | 350/96.23 |
| 4,278,835 | 7/1981 | Jackson | 174/70 R |
| 4,341,440 | 7/1982 | Trezeguet et al. | 350/96.23 |
| 4,371,234 | 2/1983 | Parfree et al. | 350/96.23 |
| 4,389,088 | 6/1983 | Trezequet | 350/96.23 |
| 4,518,632 | 5/1985 | Jones | 427/118 |
| 4,522,464 | 6/1985 | Thompson et al. | 350/96.23 |
| 4,552,432 | 11/1985 | Anderson et al. | 350/96.23 |
| 4,676,590 | 6/1987 | Priaroggia | 350/96.23 |
| 4,730,894 | 3/1988 | Arroyo | 350/96.23 |
| 4,767,182 | 8/1988 | Parfree et al. | 350/96.23 |
| 4,815,813 | 3/1989 | Arroyo et al. | 350/96.23 |
| 4,852,965 | 8/1989 | Mullin et al. | 350/96.23 |

FOREIGN PATENT DOCUMENTS

| | | |
|---|---|---|
| 0203538 | 12/1986 | European Pat. Off. |
| 3810746 | 10/1988 | Fed. Rep. of Germany |
| 2051398 | 1/1981 | United Kingdom |
| 2144559 | 3/1985 | United Kingdom |
| 2145536 | 3/1985 | United Kingdom |
| 2152235 | 7/1985 | United Kingdom |

OTHER PUBLICATIONS

W. T. Anderson, et al., "Hydrogen Gas Effects On Installed Submarine Single-Mode Fiber Cable", 1988 International Ware and Cable Symposium.

Primary Examiner—John D. Lee
Assistant Examiner—Phan T. Heartney
Attorney, Agent, or Firm—Edward W. Somers

[57] ABSTRACT

An underwater optical fiber cable (20) which is substantially free of hydrogen generation includes a core portion (22) which includes an optical transmission medium and which may comprise a terrestrial cable and a sheath system which may be an oversheath for the terrestrial cable. An outer portion of the sheath system includes a plurality of longitudinally extending strength members (42—42) each being made of a metal having a relatively low chemical or electrochemical reactivity. Covering individually each strength member is a plastic material (60) such as polyethylene.

20 Claims, 3 Drawing Sheets

UNDERWATER OPTICAL FIBER CABLE

TECHNICAL FIELD

This invention relates to an underwater optical fiber cable. More particularly, it relates to an underwater cable which overcomes problems of prior art cables that result in an unacceptable level of added loss in an optical fiber transmission medium of the cable.

BACKGROUND OF THE INVENTION

Following a somewhat recent introduction, optical fiber has experienced a meteoric rise as the predominant means of transmission media in voice and data communications. Typically, an optical fiber has a diameter on the order of 125 microns, for example, and is covered with a coating material which increases the outer diameter of the coated fiber to about 250 microns, for example. Coated optical fibers typically are assembled into units or ribbons disposed within a tubular member and enclosed in a sheath system which may take any of several forms.

Because of the increasing number of optical fiber cable miles being installed in recent years, an increasing number of underwater installations have been necessary. In many instances, these so-called water crossings have been made to effect the most economical right-of-way acquisition. Water crossings include cables which are routed across rivers, lakes and bays, for example.

Typically, an underwater cable includes a core portion comprising a plurality of optical fibers which may be in ribbon form. The core portion may comprise a complete terrestrial optical fiber cable or protective layers of plastic jacketing and/or strength members. Further, the core portion is enclosed by an outer sheath portion which often is referred to as an oversheath and which includes a plurality of layers of metallic strength members and twine bedding layers and a tar-impregnated twine outer protective wrap, for example. It has been conventional practice for the strength members of the outer sheath portion of the cable to be made of galvanized steel wire strand material. By core portion is meant the portion of the cable interior of the strength members and bedding layers of the outer sheath portion.

The layers of the strength members serve two useful purposes. First, because of anticipated marine traffic, armoring is required for mechanical protection. Also, the strength members provide sufficient weight to cause the cable to rest securely on the bottom of the body of water through which it is routed.

When an underwater cable is deployed, water enters the twine layer and migrates to the interstices of the cable armoring wires because the tar-like coating on the outer protective twine wrap does not form an integral water blocking sheath. With the water in contact with the strength members, hydrogen generation may occur.

Hydrogen-induced attenuation at both the 1310 nm and 1550 nm operating wavelengths has been observed in installed, armored underwater optical fiber cables which include the conventional galvanized wire strength members. Studies have shown that even when the core portion by itself does not generate hydrogen, added loss can occur.

Hydrogen is generated by one of two mechanisms or both. The first way is through self-corrosion of a metal. All metals, except perhaps the noble metals, e.g. gold and platinum, have some finite corrosion rate in natural environments. When a metal corrodes, the surface is covered by micro/macroscopic cells where an anodic (oxidation) reaction occurs, i.e. corrosion of the metal, but the surface also is covered by micro/macroscopic cells where a cathodic (reduction) reaction takes place. In acidic and neutral waters this cathodic reaction can produce deleterious hydrogen molecules. In order for corrosion to occur, a cathodic reaction must occur to consume the electrons liberated in a corrosion reaction, otherwise the corrosion reaction cannot take place. Metals characterized by a relatively high chemical or electrochemical reactivity are referred to as active metals, and will be more likely to produce hydrogen than a metal characterized by a relatively low chemical or electrochemical reactivity.

The second way in which hydrogen can be generated in cables is through electrical disturbances. These disturbances can be caused by galvanic cells which set up between involved metals, by electrical cells such as long cells in which the anode and cathode are separated by a relatively long distance and which set up naturally by the environment, by corrosion mitigation measures such as cathodic protection used on the cable itself, and by interference from other cathodic protection systems or from stray currents picked up from power ground return arrangements.

An electrical disturbance can induce currents on a cable and cause that cable either to corrode or to generate hydrogen. To avoid corrosion, the cable can be made cathodic by using a cathodic protection system. However, this also leads to the generation of hydrogen.

In accordance with today's government regulations, any polluting body is required to have environmental protection. An anode corrodes and is consumed. An underwater pipeline, cable, mothballed ship, bridge support or pier, for example, may be anodic and corrode. In order to prevent corrosion of the above structures, the corrosion process is reversed by applying cathodic protection to that structure. The structure is then made cathodic to an anode placed nearby in the water or ground. Due to the proximity of the cable to the cathodically protected structure or due to the electrical bonding, i.e. grounding, of the cable and the structure, currents can be induced in the cable causing the cable to produce hydrogen and/or corrode. Mitigative measures to obviate cathodic protection interference involve electrical bonding to make the cable cathodic like the interfering structure and produce hydrogen, or applying an additional cathodic protection system to the cable which would make the cable separately cathodic, but also producing hydrogen.

An electrical disturbance also can appear as electrical currents picked up by the cable which can present itself as a lower resistance ground path for an electrical power substation return. These currents can emanate from direct current traction systems, from substantial welding activity in shipyards, or from poorly grounded electrical equipment. The lengths of cable involved in power pickup would produce the hydrogen while the lengths involved in power loss would experience corrosion. Mitigation involves either electrical bonding at the power loss point or the use of a cathodic protection system on the cable, causing that cable to be cathodic.

Further, it has been found that electrical disturbances can lead to the generation of hydrogen in cables routed in fresh water as well as in sea water. Still further, electrical disturbances will cause hydrogen generation notwithstanding the use of strength members which are not active metals in the outer sheath system. By a metal which is not active is meant one which does not have a relatively high chemical or electrochemical reactivity. Even worse, the hydrogen generation may proceed whether a driving voltage is relatively low as well as relatively high.

The problem of electrical disturbances is not uncommon. For example, when a cable is routed into a manhole, exposed metals must be grounded to the grounding system in the manhole. Hence, cathodic protection in flooded manholes is commonly provided. Cathodic protection of telephone plant is standard. Further, it has been found that in some bodies of water, an electrical potential exists between different portions of the water, thereby facilitating the generation of hydrogen from cathodic structures which extend therethrough.

It had been thought that because the outer sheathing of the cable is comprised of twine with an application of tar-like material to the twine, any hydrogen which was generated would migrate out from the cable and thus no added loss would occur. This has been found to be an incorrect assumption.

Unfortunately, the hydrogen does not diffuse readily or completely out of the cable. Water in the vicinity of galvanized wire outer strength members interacts with the zinc coated, i.e. galvanized, wire and causes corrosion. Corrosion causes hydrogen gas to be given off. The hydrogen that is generated inside the cable occupies the interstices in the cable. Bubbles form, but these may be microscopic in size. The only way for the hydrogen to escape from the cable is as relatively large bubbles. Although the twine-tar layer allows water to enter the cable, it does not readily allow the hydrogen bubbles to coalesce into bubbles which are sufficiently large to escape the cable unless the rate of hydrogen generation is very high. Because hydrogen is not soluble in water, it remains in the cable. Enough remains until the outside pressure is overcome. At 32 feet of water, an additional atmosphere is required to overcome the water pressure.

Diffusion is a partial pressure (concentration) driven effect. The partial pressure of hydrogen in the optical fiber cable core is essentially zero, i.e. $10^{-6}$ atmosphere ambient, and hydrogen cannot diffuse into the water because it is not soluble there. As a result, the hydrogen diffuses into the cable core, and hence into the fibers until the partial pressure inside the optical fiber cable equates to that in the outer twine layer. The magnitude of partial pressure will show a depth dependance because the concentration (molecules/cc or partial pressure) will be greater with increasing depth. Hence, added loss in the optical fiber will be in direct proportion to the depth of the cable in the water.

The prior art has recognized the problem of hydrogen generation in cables through the mechanism of corrosion. In one prior art patent, GB 2145536, an underwater optical fiber cable includes a central tension-resisting member, a pressure-tight structure which is made of aluminum and tension-resisting members. In order to avoid degradation of the transmission medium, a number of solutions are proposed in that patent. The central tension-resisting member may be made of non-metallic material, or a pressure-tight structure is formed of copper and the central tension-resisting member is formed of copper or a non-metallic material. Metals of low chemical or electrochemical reactivity can be selected. Another solution cable includes the use of similar metals to prevent the generation of a galvanic cell. A fourth embodiment includes metallic coatings on all metallic members or those of strong chemical or electrochemical reactive forces. Another embodiment features all metallic members or at least those of high chemical or electrochemical reactivity be given a non-metallic coating.

It has been found that there are shortcomings to the solutions of the prior art. Although strength members which comprise a material of high chemical or electrochemical reactivity are coated with a non-metallic material, it has been found that under certain conditions, degradation of the transmission medium still may occur because of the diffusion of hydrogen into the core. The sought-after solution cable must offer protection for the optical fiber beyond that provided by prior art cables. Otherwise, optical fiber cables installed underwater, be it fresh or sea water, will most probably continue to experience unacceptable added loss.

None of the prior art solutions appear to address the problem of electrical disturbances. This is understandable inasmuch as this second mechanism for the generation of hydrogen which has been described earlier herein has not been recognized by the art. This potential problem caused by electrical disturbances may have been overlooked by those skilled in the art because of too much focus on cable corrosion only. What seemingly was not considered were the environment and external environmental influences.

What is needed and what seemingly is not provided for in the prior art is an underwater optical fiber cable which prevents hydrogen generation to avoid degradation of the transmission medium of the cable. Desired is a cable structure that overcomes not only the problem of hydrogen generated bt corrosion but also that caused by electrical disturbances. The sought-after protective structure should be adaptable to a number of different cable core portions. Many presently used cable designs integrate the strength member system which is required for underwater use with the core and with other elements of the sheath system of an otherwise terrestrial cable. What also is desired is a cable structure in which a non-hydrogen generating strength member system comprises a portion of an oversheath which may be used with any number of different core portions.

SUMMARY OF THE INVENTION

The foregoing problems of the prior art have been overcome by the underwater optical fiber cable of this invention. An underwater optical fiber cable includes a core portion comprising at least one optical fiber transmitting medium and an outer sheath system. Advantageously, the core portion may comprise a complete terrestrial cable. The outer sheath system includes a strength member system which includes a plurality of strength members each of which extends longitudinally and comprises a metallic material which is coated with a plastic material. The metallic material of which each strength member is comprised has a relatively low chemical or electrochemical reactivity. In a preferred embodiment, the strength members are made of stainless steel and the covering material is polyethylene.

In a preferred embodiment, the underwater cable includes a core portion which is comprised of a terrestrial cable and an oversheathing system. The terrestrial cable includes a core and a sheath system which includes a plastic jacket. Disposed about the terrestrial cable is an oversheath system which includes a plurality of strength members each made of a metal having a relatively low chemical or electrochemical reactivity. The strength members of each layer are contiguous to one another and are wrapped helically about a longitudinal axis of the cable core. Over the strength members is disposed a protective wrap.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
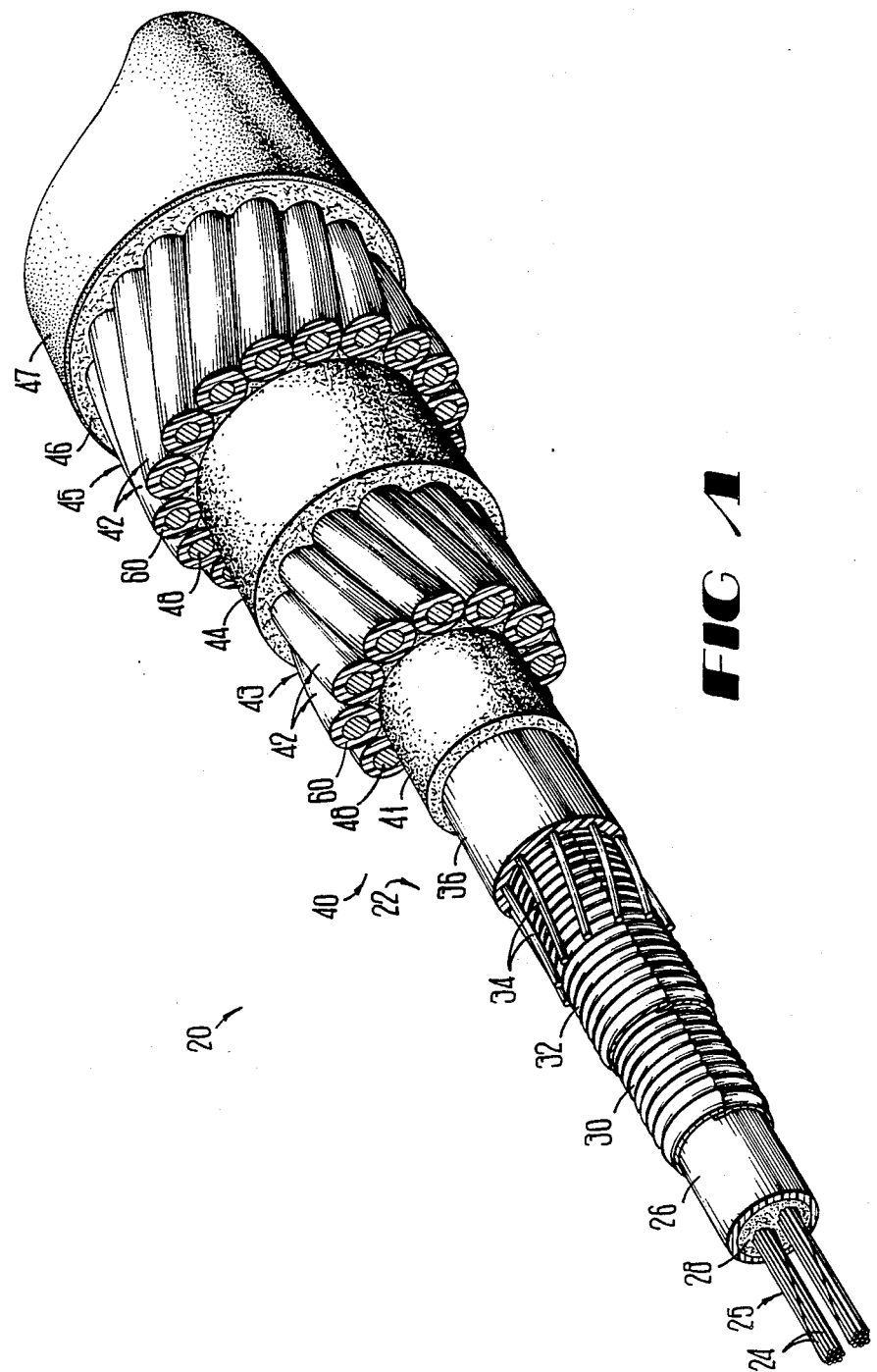
FIG. 1 is a perspective view of an optical fiber cable of this invention which includes a strength member system which renders the cable specially suited for underwater use.

Referring now to FIG. 1, there is shown a cable of this invention, said cable being designated generally by the numeral 20. The cable 20 includes a core portion 22 which includes a plurality of optical fibers 24–24 which may be arranged in individually bound units 25-25. As is seen, the optical fibers 24–24 are disposed within a tubular member 26 which may be made of a plastic material such as polyethylene. It is typical to provide optical fiber cables with some means for blocking the flow of water along the cable. In the cable which is shown in FIG. 1, a waterblocking composition 28 of matter fills the tubular member 26 and interstices among the optical fibers and groups or units of fibers.

It is advantageous to cause the ratio of the cross-sectional areas of the coated optical fibers to the area within the tubular member not to exceed a predetermined value. The cable structure described thus far is typical of terrestrial optical fiber cables which are marketed by AT&T Technologies. Such a cable may be a Lightpack® cable core, Lightpack being a registered trademark of AT&T for a lightwave cable.

Disposed about the tubular member 26 may be a sheath system which may comprise two metallic shields. An inner one of the shields is designated by the numeral 30 and is comprised of copper, for example. Overlying the inner shield is an outer shield 32 which is made of stainless steel. Further, the sheath system includes a plurality of longitudinally extending strength members 34–34 which are embedded in a jacket 36 of plastic material. An additional jacket (not shown) which may be made of polyethylene may overlie the plastic layer 36.

Figure 2:
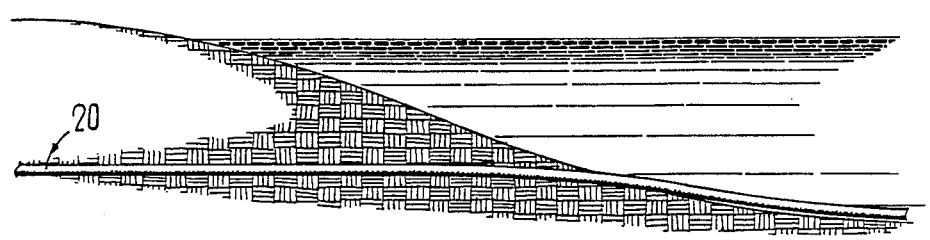
FIG. 2 depicts the cable of FIG. 1 in an underwater environment.
Figure 3:
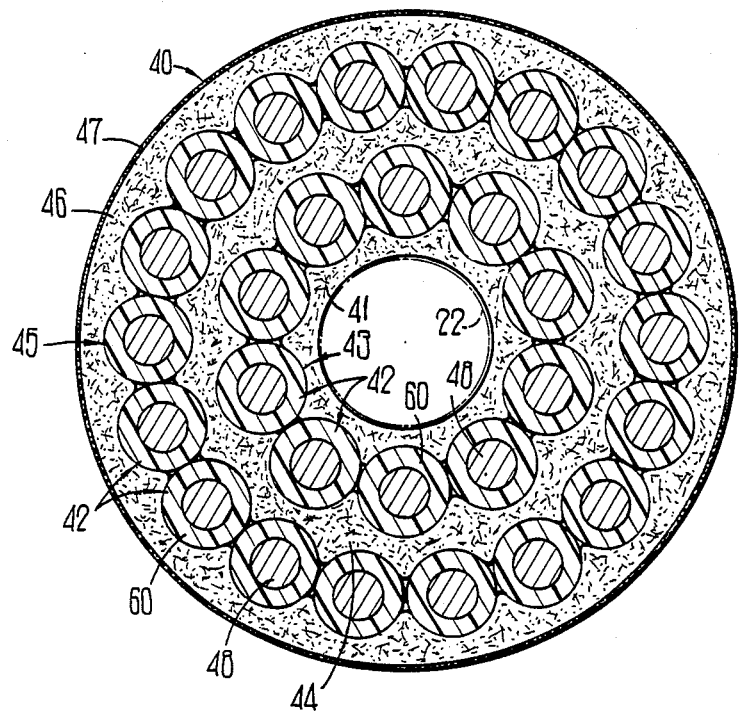
FIG. 3 is an end cross sectional view of the cable of FIG. 1.

In order to provide a cable which is suitable for underwater use such as is shown in FIG. 2, the cable 20 may include a core portion such as, for example, the core portion 22 provided with an oversheath system designated generally by the numeral 40 (see FIGS. 1 and 3). The advantage of this approach is that a manufacturer may make a standard cable which may be used on land and simply add an oversheath if an underwater cable is ordered.

As is seen in FIGS. 1 and 3, the oversheath system 40 comprises two concentric layers, for example, of strength members designated generally be the numerals 42–42. An inner layer 43 is separated from the plastic jacket 36 by a bedding layer 41 of twine, for example. Similarly, an outer layer 45 is separated from the inner layer by a bedding layer 44. A protective wrap 46 which may be made of twine, for example, and impregnated with a tar-like material 47 is disposed about the outer layer 45 of strength members.

It should be understood that less than two or more than two layers of strength members may be used in the oversheath system. Should the cable include more than two layers, adjacent layers are separated by a bedding layer of twine.

In order to cause the cable 20 to be suitable for underwater use, the strength members 42–42 must be made in a particular manner. Then and only then will the known problem of hydrogen generation be overcome. As will be recalled from the discussion hereinbefore, it is this unwanted generated hydrogen which diffuses into the optical fiber cores and causes added loss in the optical fiber transmission. Hydrogen present in glass may remain in a molecular state or may dissociate and bond chemically to the glass. In the molecular state, hydrogen causes a series of absorption peaks in the 1100 to 1600 nm region including a relatively strong peak at 1240 nm.

First, a metal portion 48 of each of the strength members 42–42 must be of a type which is not highly chemically or electrochemically reactive. A material such as stainless steel, which has a relatively low chemical or electrochemical reactivity, is used in the preferred embodiment. Further, in a preferred embodiment, each strength member is a 12 gauge stainless steel wire.

Figure 4:
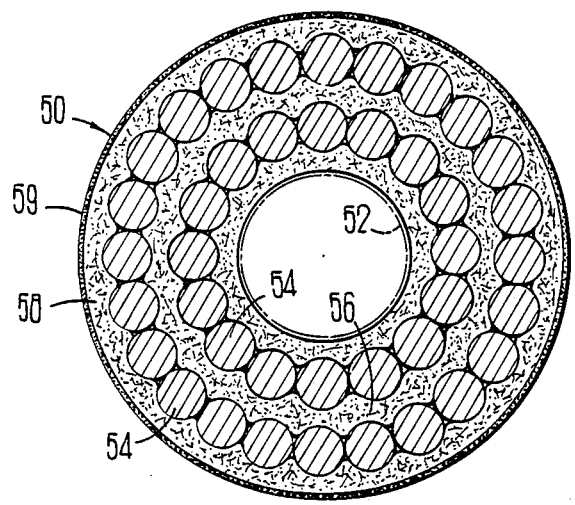
FIG. 4 is an end cross sectional view of a prior art underwater cable.

A prior art cable is shown in FIG. 4 and is designated by the numeral 50. The prior art cable 50 includes a core portion 52, and one or more layers of strength members 54–54 separated by bedding layers 56–56. An outer layer 58 of twine wrap impregnated with a tar-like material 59 covers the outer layer of strength members. Typically, the strength members 54–54 are made of galvanized steel. Recently, the making of the strength members of dielectric material or of a material having a relatively low chemical or electrochemical reactivity has been deemed sufficient to allow a cable to be used underwater.

What the prior art has overlooked and what is important from the standpoint of hydrogen generation are electrical disturbances which if present result in a cathodic reaction or hydrolysis of water, both leading to the generation of hydrogen. If a voltage for example is induced on an underwater cable, the water can be broken down, yielding hydrogen ions. Further, it has been found that this occurs notwithstanding the use of strength members material having a relatively low chemical or electrochemical reactivity. Such disturbances may occur, for example, because some states require anti-corrosive potentials in the vicinity of bridge piers, pipelines, telephone cables or other underwater structures to prevent corrosion.

Interestingly, as recently as the 1988 International Wire and Cable Symposium on Nov. 15-17, 1988 in Reno, Nev., it was reported that installations of cables including galvanized steel armor wires in underwater environments of fresh water have not shown increased attenuation at 1550 nm. The authors conclude that this may indicate that salt water is a necessary ingredient for the generation of hydrogen. Contrary to this suspicion, it has been found that hydrogen generation can indeed occur on cables routed in fresh as well as in sea water.

This can occur if there are electrical distrubances. See W.T. Anderson, et al "Hydrogen Gas Effects on Installed Submarine Single-Mode Fiber Cables" 1988 International Wire and Cable Symposium Proceedings beginning at page 188, which is incorporated by reference hereinto.

It is not sufficient merely to replace the active metal such as zinc or aluminum with a metal of relatively low chemical or electrochemical reactivity because electrolytic production from electrical disturbances such as stray currents is still possible. Only by choosing an unreactive metal, although cost rules out the very unreactive metals such as gold or platinum, and then causing the metal to be electrically non-conductive to the water, can the metal be made inert and unreactive enough not to produce hydrogen even in the presence of minor damage which can occur in installed cables. Because any hydrogen does not readily exit the cable, but builds up over time, even small production rates eventually cause problems.

In order to cause the cable 20 not to be a contributor to the generation of hydrogen, it has been found that the metal portion 48 of each of the strength members 42-42 needs to be coated individually with a layer 60 (see FIGS. 1 and 3) of a plastic material such as polyethylene. This is true even though the metal of the strength members has a relatively low chemical or electrochemical reactivity. Typically, the thickness of the plastic material which coats each strength member is about 0.04 inch. As can be seen for the drawings, the strength members of the prior art cable shown in FIG. 4 are uncoated.

As can be seen in FIGS. 1 and 3, the strength members of each layer in the oversheath system are contiguous to each other. On the other hand, the strength members 34-34 of the core cable are embedded in a plastic layer and are spaced apart around the periphery of the cable. Consequently, any penetration of the cable 20 is far more likely to intersect a strength member in the oversheath than in the portions of the inner sheath system. Also, any damage to the cable by external forces is far more likely to violate the oversheath system than portions of the inner sheath system.

Advantageously, the core or the core cable of the underwater cable of this invention is such that it does not generate hydrogen. It does not generate hydrogen because of corrosion nor does it because of electrical disturbances.

Tests have shown that with the cables of this invention, there is substantially no added loss to the optical fiber. This was found to be so whether the cable was submerged in fresh or in sea water, and whether an electrical disturbance was present or not.

Cable sections which underwent tests have the same sheath and armor structure as a cable which has been installed recently across a lake. One length of cable tested was unpowered and one had its armor layers powered at a level much higher than power disturbances experienced in the lake. After more than 260 days of test, essentially no hydrogen generation has been experienced in the unpowered cable, whereas the powered length exhibited a hydrogen generation rate that is two orders of magnitude less than that produced by the prior art galvanized armor design.

It is to be understood that the above-described arrangements are simply illustrative of the invention. Other arrangements may be devised by those skilled in the art which will embody the principles of the invention and fall within the spirit and scope thereof.

We claim:

1. An optical fiber cable which is suitable for underwater use and which is substantially free of hydrogen generation, said cable comprising:
   a core portion comprising at least one optical transmitting medium; and
   an outer sheath system which includes
      at least one layer of longitudinally extending strength members, each of said strength members comprising a metallic material having a relatively low chemical or electrochemical reactivity and being coated with a plastic material; and an outer covering.

2. The cable of claim 1, wherein said metallic material is stainless steel.

3. The cable of claim 1, wherein said plastic material comprises polyethylene.

4. The cable of claim 1, wherein said outer covering comprises a layer of twine having a tar-like material applied thereto.

5. The cable of claim 1, wherein said outer covering comprises a layer of twine which is impregnated with a tar-like material.

6. The cable of claim 1, wherein said strength members of relatively low chemical and electrochemical reactivity are wrapped helically about said core portion in contiguous relationship to each other.

7. The cable of claim 1, wherein said core portion includes a plastic jacket and said outer sheath system includes a bedding layer which is disposed in engagement with said plastic jacket between said plastic jacket and said at least one layer of strength members.

8. The cable of claim 1, wherein said outer sheath system includes at least two layers of strength members and wherein said cable also includes a bedding layer which is disposed between said two layers of strength members.

9. The optical fiber cable of claim 8, wherein said core portion includes a core comprising said at least one optical transmitting medium and an inner sheath system having a jacket, and said outer sheath system includes a bedding layer which is disposed between said jacket of said inner sheath system and an innermost layer of strength members of said outer sheath system.

10. An optical fiber cable which is suitable for underwater use, said cable comprising:
   a core cable which includes at least one optical fiber transmitting medium and which is suitable for terrestrial use; and
   an oversheath system which is substantially free of hydrogen generation and which encloses said core cable which is suitable for terrestrial use, said oversheath system which comprises:
      at least one layer of longitudinally extending strength members, each of said strength members comprising a metallic material having a relatively low chemical or electrochemical reactivity and being enclosed individually with a cover comprising a plastic material; and
      an outer covering which encloses said at least one layer of longitudinally extending strength members.

11. The cable of claim 10, wherein said core portion includes a plastic jacket and said oversheath system includes a bedding layer which is disposed in engagement with said plastic jacket between said plastic jacket and said at least one layer of strength members.

12. The cable of claim 10, wherein said oversheath system includes at least two layers of strength members and wherein said cable also includes a bedding layer which is disposed between said two layers of strength members.

13. The optical fiber cable of claim 12, wherein said core cable includes a core comprising said at least one optical transmitting medium and an inner sheath system having a jacket, and said oversheath system includes a bedding layer which is disposed between said jacket of said inner sheath system and an innermost layer of stength members of said oversheath system.

14. The cable of claim 10, wherein said terrestrial cable includes
   a core comprising at least one optical fiber transmission medium; and
   an inner sheath system which comprises
      a plurality of strength members; and
      at least one jacket which is made of a plastic material.

15. The optical fiber cable of claim 14, wherein said strength members of said inner sheath system are embedded in a jacket of plastic material.

16. The cable of claim 14, wherein said inner sheath system includes at least one metallic shield.

17. The cable of claim 14, wherein said core cable comprises a plurality of optical fibers and a tubular member in which said optical fibers are disposed.

18. The cable of claim 17, wherein said optical fibers are arranged in at least one unit which is not stranded.

19. The cable of claim 10, wherein said outer covering comprises a layer of twine which has been impregnated with a tar-like material.

20. The cable of claim 10, wherein each of said strength members of said oversheath system is wrapped helically about said core cable and wherein the strength members of each layer are in contiguous relationship to each other.

* * * * *